United States Patent
Fujimori

[11] Patent Number: 5,995,506
[45] Date of Patent: Nov. 30, 1999

[54] COMMUNICATION SYSTEM

[75] Inventor: Junichi Fujimori, Hamamatsu, Japan

[73] Assignee: Yamaha Corporation, Hamamatsu, Japan

[21] Appl. No.: 08/856,438

[22] Filed: May 14, 1997

[30] Foreign Application Priority Data

May 16, 1996 [JP] Japan .................................. 8-144845

[51] Int. Cl.[6] ....................................................... H04J 3/24
[52] U.S. Cl. .......................... 370/389; 370/394; 370/474; 370/471
[58] Field of Search ..................... 370/420, 421, 370/394, 470, 471, 473, 474, 522, 389

[56] References Cited

U.S. PATENT DOCUMENTS

| | | | |
|---|---|---|---|
| 4,703,477 | 10/1987 | Adelmann et al. ..................... | 370/474 |
| 4,939,725 | 7/1990 | Matsuda et al. ........................ | 370/445 |
| 5,222,061 | 6/1993 | Doshi et al. ............................. | 370/394 |
| 5,274,637 | 12/1993 | Sakamura et al. . | |
| 5,383,182 | 1/1995 | Therasse et al. ........................ | 370/394 |
| 5,386,415 | 1/1995 | Ito et al. .................................. | 370/394 |
| 5,400,337 | 3/1995 | Munter .................................... | 370/399 |
| 5,553,083 | 9/1996 | Miller ...................................... | 371/32 |
| 5,559,962 | 9/1996 | Okamura et al. . | |
| 5,598,415 | 1/1997 | Nuber et al. ............................. | 370/474 |
| 5,606,556 | 2/1997 | Kawanishi et al. ..................... | 370/471 |
| 5,754,789 | 5/1998 | Nowatzyk et al. ................ | 395/200.63 |
| 5,832,085 | 11/1998 | Inoue et al. ............................... | 348/10 |

FOREIGN PATENT DOCUMENTS

| | | |
|---|---|---|
| 56-3587 | 1/1981 | Japan . |
| 59-139093 | 8/1984 | Japan . |
| 62-129889 | 6/1987 | Japan . |
| 62-141591 | 6/1987 | Japan . |
| 6-19475 | 1/1994 | Japan . |
| 7-121159 | 5/1995 | Japan . |
| 7-199975 | 8/1995 | Japan . |

*Primary Examiner*—Dang Ton
*Assistant Examiner*—Eva Tang
*Attorney, Agent, or Firm*—Graham & James LLP

[57] ABSTRACT

A communication system includes a data-transmitting unit, at least one data-receiving unit, and a network connecting the data-transmitting unit and the at least one data-receiving device with each other. The data-transmitting unit comprises a first network circuit that adds identification information for identifying attributes of data for transmission to the data for transmission and changes the identification information when there is a change in the attributes of the data for transmission. The at least one data-receiving unit each comprise a second network circuit that delivers a signal demanding attribute information indicative of the attributes of the data when there is a change in the identification information added to the data received from the data-transmitting unit.

21 Claims, 5 Drawing Sheets

FIG.2

ATTRIBUTE INFORMATION
(ATTRIBUTELIST)

| NAME | CONTENTS |
|---|---|
| ATTRIBUTE IDENTIFIER (ATTRIBUTEID) | |
| DATA FORMAT IDENTIFIER ID (DATAFORMATID) | |
| DATA FORMAT (DATAFORMAT) | |
| TITLE(TITLE) | |

FIG.3

BROADCAST PACKET FORMAT

| |
|---|
| ATTRIBUTE IDENTIFIER (ATTRIBUTEID) |
| TIME STAMP(TIMESTAMP) |
| NUMBER OF SAMPLES (NSAMPLES) |
| DATA(0) |
| DATA(1) |
| ⋮ |
| DATA(N−1) |

COMMUNICATION SYSTEM

BACKGROUND OF THE INVENTION

1. Field of the Invention

This invention relates to a communication system for transmitting and receiving data, such as audio data and image data, between a data-transmitting unit and data-receiving units connected to each other via a network.

2. Prior Art

Conventionally, there is known a communication system constituted by a data-transmitting unit, data-receiving units, and a network connecting the data-transmitting unit with the data-receiving units, wherein the data-transmitting unit generates data, such as audio data and image data, in a predetermined format (defining a data compression format, sampling frequency, etc.) and sends the generated data to the data-receiving units together with attribute information indicative of attributes of the generated data, i.e. the predetermined format, while the data-receiving units each interpret (evaluate) the received data based on the attribute information received together therewith.

The attribute information is changed, in the case of transmission of musical sound data, e.g. when an attribute of the musical sound data, such as sampling frequency, is changed between songs or tunes. In general, however, such a change in the attribute information does not occur so frequently. On the other hand, the attribute information is large in amount compared with the amount of data transmitted per unit time. Therefore, to improve the efficiency of data transmission, a method of data transmission has been conventionally employed in which the attribute information is sent only once just before transmission of data such as musical sound data, e.g. by allocating the attribute information at the head of song or tune data.

The conventional communication system employs the above method of sending attribute information on the assumption that the data-transmitting unit per se and the data-receiving units per se are not changed during data transmission, and this can cause failure of normal data transmission and reception. For example, if the data-receiving unit is changed to another data receiving unit, or a new data-receiving unit is connected to the network, i.e. the correspondence between the data-transmitting unit and the data-receiving unit is changed, before transmission of a series of data, such as data of musical pieces (musical sound data), is completed, the other or newly connected data-receiving unit does not have the attribute information immediately after the just change or the new connection, so that this unit cannot determine what format the received data has, and as a result cannot interpret the received data, whereby normal data transmission and reception cannot be instantly carried out.

One possible solution to the above problem would be to transmit attribute information, constantly or at predetermined time intervals, throughout the whole process of data transmission. However, this solution suffers from a drawback of degraded data transmission efficiency due to frequent transmission of attribute information large in amount. Further, the above technique of transmitting data at predetermined time intervals suffers from another drawback that the other or newly-connected data-receiving unit cannot obtain the attribute information instantly after the unit change or the new connection, depending on the timing thereof, and in such a case it takes a certain time period before the settings of the newly connected data-receiving unit become effective. In short, there is a problem that the data-receiving unit cannot instantly perform proper interpretation of the received data after the unit change or the new connection.

Thus, the conventional communication system suffers from incompatibility between the demand for enhanced data transmission efficiency and the demand for instant proper interpretation of the received data by data-receiving units, which is essentially difficult for the conventional communication system to overcome.

SUMMARY OF THE INVENTION

It is an object of the invention to provide a communication system and method which enable a data-receiving unit newly selected or newly connected to a network thereof to perform proper interpretation of the received data in a reliable manner instantly after the selection or the connection to the network, without degrading the data transmission efficiency.

To attain the above object, according to a first aspect of the invention, there is provided a communication system including a data-transmitting unit, at least one data-receiving unit, and a network connecting the data-transmitting unit and the at least one data-receiving device with each other.

The communication system according to the first aspect of the invention is characterized in that the data-transmitting unit comprises a first network circuit that adds identification information for identifying attributes of data for transmission to the data for transmission and changes the identification information when there is a change in the attributes of the data for transmission, and the at least one data-receiving unit each comprise a second network circuit that delivers a signal demanding attribute information indicative of the attributes of the data when there is a change in the identification information added to the data received from the data-transmitting unit.

Preferably, the data-transmitting unit includes a transmit data buffer that forms the data for transmission into packets and deliver each of the packets to the first network circuit, the first network circuit adding the identification information to the each of the packets.

More preferably, the data-transmitting unit includes a data generator that generates the data for transmission and delivers the data for transmission to the transmit data buffer, the data generator generating the attribute information of the data for transmission, packet by packet, in a manner such that the attribute information corresponds to the each of the packets, and delivering the attribute information to the first network circuit, the first network circuit comparing the attribute information corresponding to a present one of the packets and the attribute information corresponding to an immediately preceding one of the packets, and changing the identification information when the attribute information corresponding to the present one of the packets is different from the attribute information corresponding to the immediately preceding one of the packets.

Preferably, the first network circuit is responsive to the signal demanding the attribute information from the second network circuit of any one of the at least one data-receiving unit, for delivering the attribute information demanded by the signal to the any one of the at least one data-receiving unit.

Alternatively, the at least one data-receiving unit comprises a plurality of data-receiving units, the first network circuit being responsive to the signal demanding the attribute information from the second network circuit of any one of the plurality of data-receiving units, for delivering the attribute information demanded by the signal to all of the plurality of data-receiving units.

Further preferably, the attribute information is transmitted in a packet, the packet containing the identification information.

More preferably, the data-transmitting unit includes a timer circuit that generates a time stamp for determining timing of regeneration of samples contained in the each of the packets and delivers the time stamp to the first network circuit, the first network circuit adding the time stamp to the each of the packets of the data for transmission.

Further preferably, the first network circuit of the data-transmitting unit adds information indicative of a number of the samples contained in the each of the packets to the each of the packets.

Still more preferably, the at least one data-receiving unit each include a timing generator that determines timing of regeneration of each of the samples based on the time stamp and the information indicative of the number of the samples both received from the second network circuit.

Even more preferably, the at least one data-receiving unit each include a received data buffer that stores the data, the attribute information, and the identification information, all received from the second network circuit.

Even further preferably, the at least one data-receiving unit each include a data-utilizing circuit that takes out each of the samples from the received data buffer based on the timing of the regeneration to utilize the data.

To attain the above object, according to a second aspect of the invention, there is provided a method of transmitting data from a data-transmitting unit to at least one data-receiving unit via a network, comprising the steps of adding identification information for identifying attributes of the data for transmission to the data for transmission at the data-transmitting unit, changing the identification information when there is a change in the attributes of the data for transmission, at the data-transmitting unit, and demanding attribute information indicative of the attributes of the data from the at least one data-receiving unit when there is a change in the identification information added to the data received from the data-transmitting unit.

Preferably, the method includes a step of transmitting the attribute information from the data-transmitting unit to any one of the at least one data-receiving unit when the any one of the at least one data receiving unit has demanded the attribute information.

Alternatively, the at least one data-receiving unit comprises a plurality of data-receiving units, the method including a step of transmitting the attribute information from the data-transmitting unit to all of the plurality of data-receiving units when any one of the plurality of data-receiving units has demanded the attribute information.

The above and other objects, features, and advantages of the invention will become more apparent from the following detailed description taken in conjunction with the accompanying drawings.

BRIEF DESCRIPTION OF THE DRAWINGS

FIG. 2 is a diagram showing an example of the data format of attribute information transmitted and received in the communication system of FIG. 1 (attribute list);

FIG. 3 is a diagram showing an example of the data format of a packet of broadcast data transmitted and received in the communication system of FIG. 1;

DETAILED DESCRIPTION

The invention will now be described in detail with reference to the drawings showing an embodiment thereof.

Figure 1:
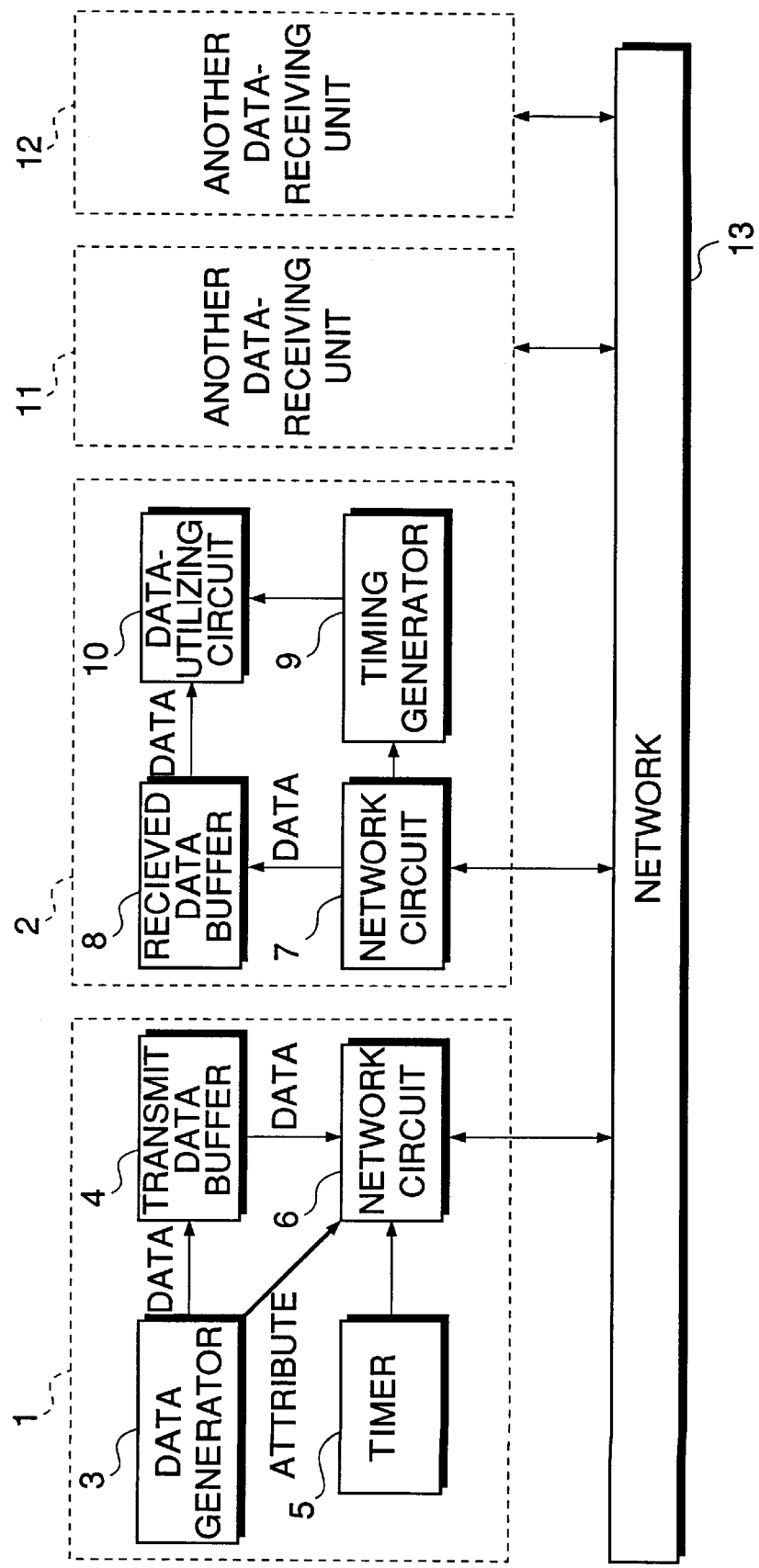
FIG. 1 is a block diagram showing the whole arrangement of a communication system according to an embodiment of the invention.

FIG. 1 shows the whole arrangement of a communication system according to an embodiment of the invention.

The communication system 14 of the embodiment is comprised of a data-transmitting unit 1, a data-receiving unit 2 and other data-receiving units 11, 12, and a network 13 connecting these units to each other. The number of data-receiving units connected to the network 13 is not limited to three as in the illustrated embodiment.

The data-transmitting unit 1 is comprised of a data generator 3, a transmit data buffer 4, a timer 5, and a network circuit 6, and is connected to the network 13 via the network circuit 6 for bidirectional communication therewith. The data generator 3, the transmit data buffer 4, and the timer 5 are connected to the network circuit 6. The data generator 3 is connected to the transmit data buffer 4, as well.

The data-receiving unit 2 is comprised of a network circuit 7, a received data buffer 8, a timing generator 9, and a data-utilizing circuit 10, and is connected to the network 13 via the network circuit 7 for bidirectional communication therewith. The received data buffer 8 and the timing generator 9 are connected to the network circuit 7, and the received data buffer 8 and the timing generator 9 are connected to the data-utilizing circuit 10.

The other data-receiving units 11 and 12 are identical or similar in construction to the data-receiving unit 2.

Next, the functions and operations of the above-mentioned components of the data-transmitting unit 1 and the data-receiving unit 2 will be described.

The data generator 3 of the data-transmitting unit 1 generates data, such as audio data and dynamic image data (hereinafter referred to as "the main data"), and delivers the main data to the transmit data buffer 4. The transmit data buffer 4, which is formed by a RAM (random access memory) or the like, forms the main data into packets and stores the packets. The packets of the main data stored in the transmit data buffer 4 are delivered to the network circuit 6. The data generator 3 further generates attribute information related to the generated main data (i.e. information on the format of the main data based on which transmitted data is to be interpreted (evaluated), which defines a data compression format, sampling frequency, etc.), for each packet of the main data, and directly delivers the attribute information to the network circuit 6. The timer 5 generates timing information, such as a time stamp (TIMESTAMP), referred to hereinafter, and delivers the timing information to the network circuit 6.

The network circuit 6 includes a CPU (central processing unit), a ROM (road only memory) storing a program, referred to hereinafter, control parameters, etc., a RAM (random access memory) for temporarily storing results of operations of the CPU, an interface, etc., none of which are shown, and controls the transmission and reception of data via the network 13. The network circuit 6 adds an attribute identifier (ATTRIBUTEID) as identification information which is updated whenever any of the attributes of the main data is changed, the number of samples N (NSAMPLES) indicative of the number of data samples forming the main data, and the time stamp (TIMESTAMP) supplied from the timer 5, to each packet of the main data received from the transmit data buffer 4 to thereby generate a packet of data in a predetermined format conforming to the broadcast method (hereinafter referred to as "broadcast data"). The communication system 14 of the present embodiment adopts a so-called broadcast communication method in which data transmitted from one transmission station (data-transmitting unit 1) is received by a plurality of receiving stations (data-receiving units 2, 11, 12). Therefore, the above broadcast data is transmitted to all the data-receiving units connected to the network 13, more specifically to the network circuit 7 e.g. of the data-receiving unit 2. The transmission of the broadcast data is carried out by an interrupt-handling routine, described hereinafter, at time intervals of 125 μs based on operation of the timer 5.

The network circuit 6 further receives a demand for transmission of attribute information of the broadcast data from any of the data-receiving units 2, 11, and 12, and responds thereto, as well as receives usual packets and carries out processing in response thereto.

The network circuit 7 of the data-receiving unit 2 includes a CPU, a ROM storing a program, referred to hereinafter, control parameters, etc., a RAM, an interface, etc., none of which are shown, and controls the transmission and reception of data via the network 13.

The network circuit 7 of the data-receiving unit 2 receives broadcast data from the network circuit 6 of the data-transmitting unit 1 via the network 13 and takes out timing information, i.e. a time stamp and the number of samples, from the broadcast data to deliver the same to the timing generator 9, and delivers data other than the timing information, i.e. the main data and the attribute identifier to the received data buffer 8. The network circuit 7 further delivers attribute information of the main data obtained by demanding the same from the data-transmitting unit 1, to the received data buffer 8. The received data buffer 8 stores packets of the main data and the attribute identifier and the attribute information received from the network circuit 7.

The timing generator 9 generates a timing signal based on the timing information received from the network circuit 7 and delivers the same to the data-utilizing circuit 10, which takes out data from the received data buffer 8 at timing based on the timing signal and processes the data taken out.

The data-utilizing circuit 10-includes a CPU, a RAM, etc., none of which are shown, and processes data received from the received data buffer 8. More specifically, the CPU thereof carries out interpretation of the main data based on the attribute information, and processing of the main data, etc.

FIG. 2 shows an example of the data format of the attribute information (ATTRIBUTELIST) transmitted and received in the communication system of the present embodiment. The attribute information is sent from the network circuit 6 of the data-transmitting unit 1 to the network circuit 7 of the data-receiving unit 2 in response to a demand for transmission of the same by the data-receiving unit 2 and stored in the RAM of the data-utilizing circuit 10.

In FIG. 2, the attribute identifier (ATTRIBUTEID) is identification information added to each packet of the main data, as mentioned above, and represented by a numerical value of five binary digits (bits) which is initially set to "00001". It should be noted that the attribute identifier of each data-receiving unit is reset to "00000" before it is connected to the network 13. The attribute identifier is updated whenever any of the attributes of the main data is changed. More specifically, when the attribute information of the main data of the immediately preceding packet and the attribute information of the main data of the present packet to be transmitted are different from each other, the numerical value of the attribute identifier is incremented by "1" by the network circuit 6.

The data format identifier (DATAFORMATID) is identification information for identifying the data format. The data format (DATAFORMAT) includes a format of digital image data (DVCR), an image compression format (MPEG etc.), a format of digital audio data, and a digital audio data compression format, the format of digital audio data being dependent on sampling frequency of the data, etc. Further, the title (TITLE) is information indicative of the title of a song or tune of musical tone data.

FIG. 3 shows an example of the data format of broadcast data (packet) transmitted and received in the communication system of the present embodiment. The broadcast data is transmitted from the network circuit 6 of the data-transmitting unit 1 at time intervals of e.g. 125 μs, and received by the network circuit 7 of the data-receiving unit 2 to be interpreted and processed by the data-utilizing circuit 10.

In FIG. 3, the attribute identifier (ATTRIBUTEID) is identification information identical to that described with reference to FIG. 2.

Figure 4:
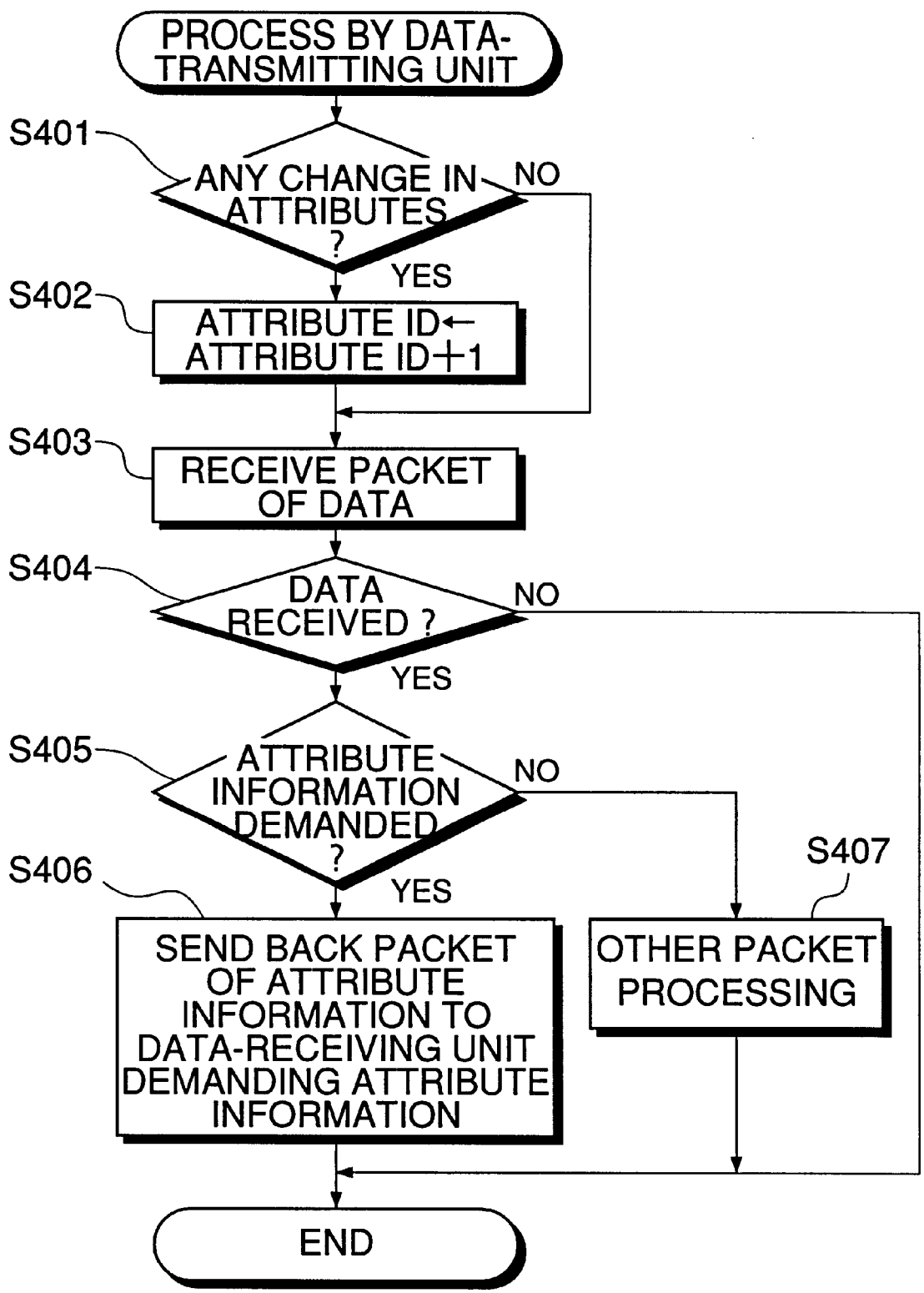
FIG. 4 is a flowchart showing a program for carrying out processes, which are executed by a data-transmitting unit of the FIG. 1 communication system.
Figure 5:
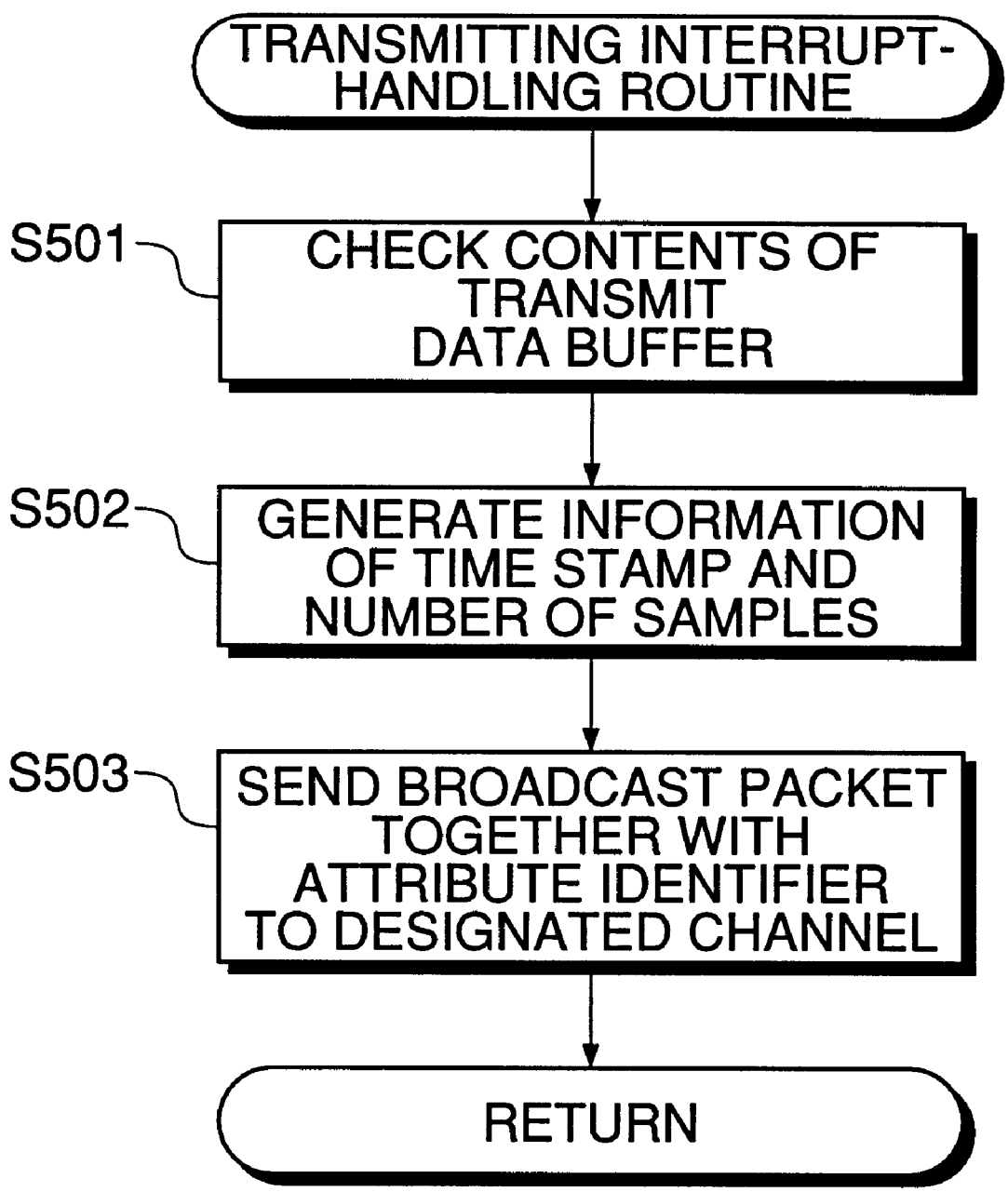
FIG. 5 is a flowchart showing an interrupt-handing routine for transmitting broadcast data, which is carried out by the data-transmitting unit.

The time stamp (TIMESTAMP) is time information defining a time point at which the broadcast data should start to be regenerated, more specifically, a value representative of a time period assumed by the timer 5 when an interrupt for processing of FIG. 5 is generated during execution of FIG. 4 processing, referred to hereinafter. The number of samples (NSAMPLES) is information indicative of the number of data samples contained in each of packets of broadcast data accumulated within the transmit data buffer 4. In the present embodiment, each packet of broadcast data is assumed to contain N data samples. DATA (0) to DATA(N−1) represent data samples, i.e. data samples obtained by sampling the main data.

The time stamp (TIMESTAMP) is generated by the timer 5 and the network circuit 6, and used when the data-utilizing circuit 10 takes out data from the received data buffer 8.

More specifically, the time stamp and the number of samples N are received as part of broadcast data by the network circuit 7, and out of the received broadcast data, the time stamp indicative of time information and the number of samples N alone are supplied to the timing generator 9. The timing generator 9 generates a clock based on the immediately preceding time stamp TSA, the present time stamp STB, and the present number of samples N, to thereby determine timing of regeneration of each data sample of the main data contained in the present packet having been received. More specifically, a time point of delivery of each data sample is determined by the use of the equation of (TSB−TSA)/N.

The data-utilizing circuit 10 takes out the main data from the received data buffer 8 at the timing of regeneration calculated as above.

It should be noted that compared with a case in which the data-utilizing circuit 10 takes out main data from the received data buffer 8 according to timing information generated by the timing generator 9 based on sampling frequency of the main data (e.g. a case in which each data sample is read out at time intervals of 1/44 (KHz) assuming that the sampling frequency is 44 (KHz)), the use of the time stamp (TIMESTAMP) prevents a sampling error due to tolerances in the accuracy of operations of the timer 5 and the timing generator 9, whereby more accurate timing of regeneration of the main data can be obtained.

Further, the broadcast data may contain information on channels through which the data are to be transmitted.

Now, the transmission and reception of broadcast data, the attribute identifier, attribute information, etc. between the data-transmitting unit 1 and the data-receiving unit 2 will be described.

FIG. 4 shows a program for carrying out processes, which are executed by the CPU of the network circuit 6 of the data-transmitting unit 1.

First, it is determined at a step S401 whether or not there has been a change in the attributes of the main data to be transmitted, i.e. whether or not the attribute information of the main data of the present packet to be transmitted is different from the attribute information of the main data of the immediately preceding packet transmitted. If it is determined at the step S401 that there has been a change in the attributes of the main data, the attribute identifier (ATTRIBUTEID) is incremented by "1" at a step S402, and then the program proceeds to a step S403, whereas if there has been no change in the attributes of the main data, the program jumps to the step S403.

At the step S403, a process for receiving a packet of any of various kinds of data is carried out, if it has been transmitted from the data-receiving unit 2, and it is determined at a step S404 whether or not a packet has been received at the step S403. If it is determined at the step S404 that a packet has been received, it is determined at a step S405 whether or not the packet contains a demand for transmission of attribute information. If it is determined that the packet contains the demand for transmission of the attribute information, the program proceeds to a step S406.

At the step S406, the attribute information of the main data being currently transmitted is sent to the data-receiving unit 2, which demands the transmission of the attribute information, in response to its demand for transmission, followed by terminating the program.

On the other hand, if it is determined at the step S404 that no packet has been received at the step S403, the program is immediately terminated.

Similarly, if it is determined at the step S405 that the received packet contains no demand for transmission of the attribute information, a process corresponding to the received packet other than the transmission of attribute information is carried out at a step S407, followed by terminating the program.

FIG. 5 shows the interrupt-handing routine for transmitting broadcast data, which is executed by the CPU of the network circuit 6 at time intervals of e.g. 125 μs based on the timing signal delivered from the timer 5 during execution of the FIG. 4 program.

First, contents of data stored in the transmit data buffer 4 are inspected at a step S501, and a time stamp and the number of samples N as timing information are generated at a step S502. The broadcast data with the attribute identifier added thereto is sent to a designated channel at a step S503, followed by terminating the program.

Figure 6:
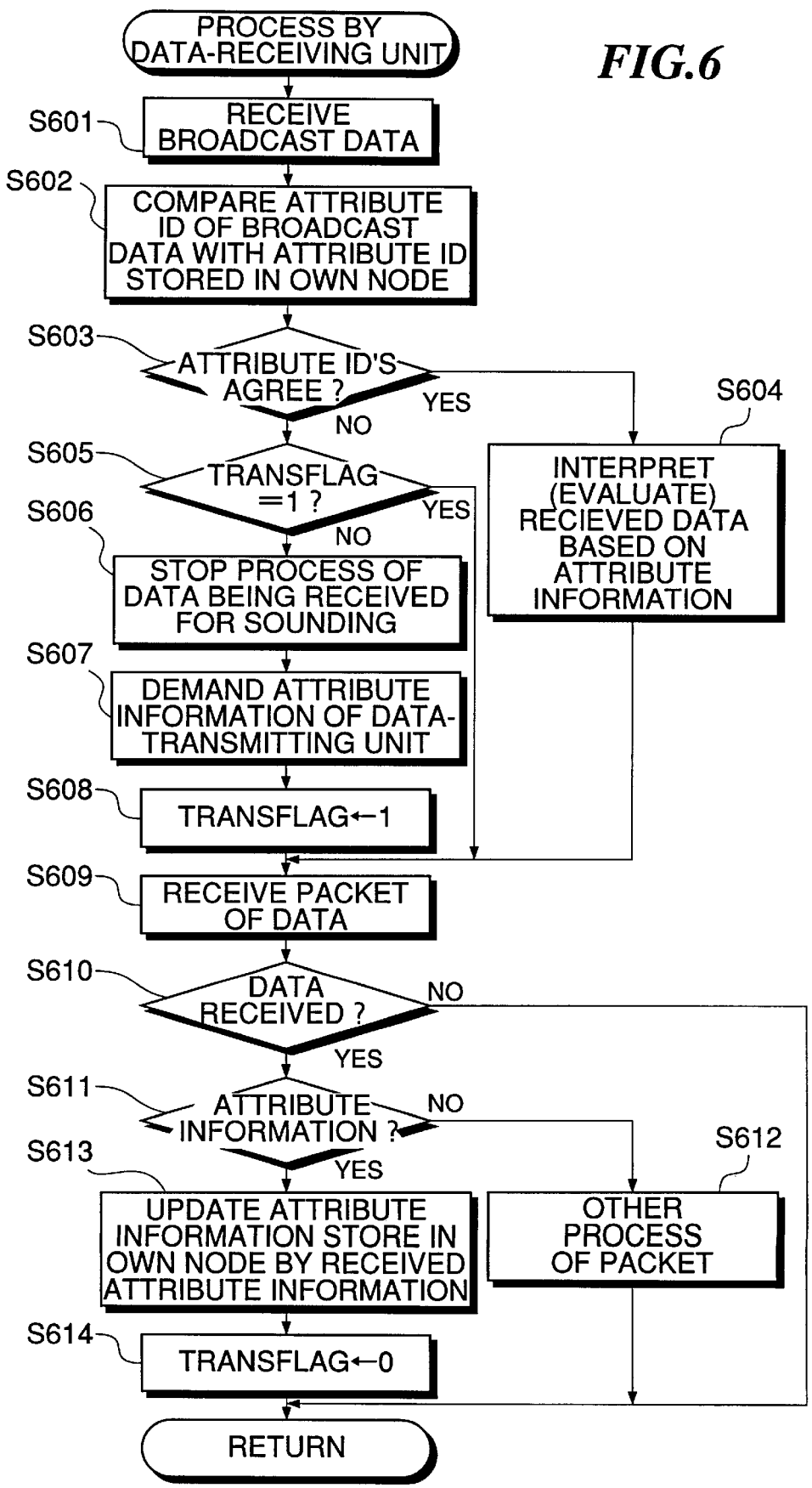
FIG. 6 is a flowchart showing a program for carrying out processes, which are executed by a data-receiving unit of the FIG. 1 communication system.

FIG. 6 shows a program for carrying out processes, which are executed by the CPU of the network circuit 7 of the data-receiving unit 2. The processes are largely divided into a process for receiving broadcast data and a process for receiving packet data including attribute information, the former being executed at steps S601 to S608, and the latter at steps S609 to S614.

First, the broadcast data transmitted from the network circuit 6 of the data-transmitting unit 1 according to the FIG. 5 process is received at a step S601. Then, at a step S602, the attribute identifier in the received broadcast data is compared with the attribute identifier stored at its own node, i.e. the attribute identifier of the data processed on the immediately preceding occasion by the data-receiving unit 2.

If the data-receiving unit 2 has been newly connected to the network 13 or in similar cases, the attribute identifier contained in the received broadcast data and the attribute identifier stored at its own node do not agree with each other.

Based on results of the comparison at the step S602, it is determined at a step S603 whether or not the attribute identifier contained in the received broadcast data agrees with the attribute identifier stored at its own node, i.e. in the data-receiving unit 2. If it is determined at the step S603 that the former agrees with the latter, the data-utilizing circuit 10 interprets (evaluates) the main data in the received broadcast data based on the attribute information stored in the RAM of the data-utilizing circuit 10 at a step S604, followed by the program proceeding to a step S609.

On the other hand, if it is determined at the step S603 that the attribute identifier contained in the received broadcast data does not agree with the attribute identifier stored at its own node, it is determined at a step S605 whether or not an update detection flag TRANSFLAG, which, when set to "1", indicates that the attribute identifier contained in the transmitted broadcast data has been updated (incremented by the network circuit 6 of the data-transmitting unit 1), assumes "1". When this step is first executed, the update detection flag TRANSFLAG is not set to "1", so that the program proceeds to a step S606, wherein the processing of the main data being received for generation (e.g. audio data being processed for sounding) is stopped. Then, a demand for transmission of the attribute information of the main data being currently received is transmitted to the data-transmitting unit 1 at a step S607, and the update detection flag TRANSFLAG is set to "1" at a step S608, followed by the program proceeding to a step S609.

If it is determined at the step S605 that the update detection flag TRNSFLAG is set to "1", the program skips over the steps S606 to S608 to the step S609. As a result, when a change in the attributes of the main data has been detected at the step S603 and the demand for transmission of the attribute information has once been sent to the data-transmitting unit 1, the steps S606 to S608 are skipped over until the attribute information is received at the step S609, referred to hereinafter, and the attribute information stored at its own node is updated by the received attribute information at a step S613, referred to hereinafter.

It should be noted that when the demand for transmission of the attribute information has been sent from the data-receiving unit 2, it is determined at the step S405 in FIG. 4 that the packet received by the data-receiving unit 1 contains the demand for transmission of the attribute information.

Further, the attribute information sent from the data-transmitting unit 1 in response to the demand at the step S406 in FIG. 4 and the broadcast data transmitted from the data-transmitting circuit 1 at the step S503 in FIG. 5 are received at the step S609 in FIG. 6.

Referring again to FIG. 6, a packet, if it has been transmitted from the data-transmitting unit 1, is received at the step S609, and then it is determined at a step S610 whether or not a packet has been received at the step S609. If it is determined at the step S610 that the packet has been received, it is determined at a step S611 whether or not the received packet is a packet of the attribute information. If it is determined at the step S611 that the packet of the attribute information has been received, the program proceeds to the step S613, wherein the attribute information stored in the RAM of the data-utilizing circuit 10 is updated by the received attribute information, and the update detection flag TRANSFLAG is set to "0" at a step S614, followed by terminating the program.

On the other hand, if it is determined at the step S610 that no packet has been received, the present program is immediately terminated.

Further, if it is determined at the step S611 that the received packet does not contain the attribute information, a process corresponding to the received packet other than the updating of the attribute information is carried out at a step S612, followed by terminating the program.

According to the program routines of FIGS. 4 to 6, the data-transmitting unit 1 transmits broadcast data to the data-receiving unit 2 at fixed time intervals of 125 μs, and updates the attribute identifier when any of the attributes of the main data has been changed. On the other hand, the data-receiving unit 2 demands transmission of the attribute information from the data-transmitting unit 1 only when the attribute identifier contained in the broadcast data does not agree with the attribute identifier stored at its own node. The data-transmitting unit 1 transmits the attribute information to the data-receiving unit 2 only when the demand for transmission of the attribute information is received.

As described above, according to the present embodiment, attribute information per se is not added to the main data but an attribute identifier, small in amount of information, for determining whether there has been any change in the attribute information, is added to the main data. As a result, the data-transmitting unit 1 is not required to frequently transmit the attribute information large in amount of information, to the data-transmitting unit 1, thereby minimizing the amount of information to be transmitted therefrom. Further, the attribute identifier as information on the attributes of the main data is added to all packets of the main data, so that a data-receiving unit newly connected to the network 13, a data-receiving unit already connected to the network but not yet provided with attribute information of the main data, etc. can instantly obtain the attribute information. As a result, the data-receiving unit newly connected to the network 13 or newly selected can carry out proper interpretation of the received data instantly and in a reliable manner without degrading the efficiency of data transmission.

Further, the above described process for transmitting and receiving data is particularly effective for communication by the broadcast method in which one data-transmitting unit uniformly transmits data to a plurality of data-receiving units.

Although in the above embodiment, the attribute identifier is represented by five binary digits (bits), this is not limitative but it may be represented by any numerical data so long as it is smaller in amount of information than the attribute information.

Further, according to the present embodiment, the data-transmitting unit transmits attribute information in response to a demand for transmission of the attribute information to a specific data-receiving unit 2 having demanded the transmission, this is not limitative, but the attribute information may be transmitted to all the data-receiving units connected to the network 13 when any one of them has demanded the transmission of attribute information. This reduces the amount of data of packets of attribute information to be transmitted.

What is claimed is:

1. A communication system comprising:

a data-transmitting unit;

at least one data-receiving unit; and a network connecting said data-transmitting unit and said at least one data-receiving unit with each other, wherein said data-transmitting unit comprises a first network circuit that adds identification information for identifying attributes of data for transmission to said data for transmission and changes said identification information when there is a change in said attributes of said data for transmission;

said at least one data-receiving unit each comprises a second network circuit that delivers a signal demanding attribute information indicative of said attributes of said data when there is a change in said identification information added to said data received from said data-transmitting unit;

said data-transmitting unit includes a transmit data buffer that forms said data for transmission into packets and delivers each of said packets to said first network circuit, said first network circuit adding said identification information to said each of said packets, wherein said data-transmitting unit includes a data generator that generates said data for transmission and delivers said data for transmission to said transmit data buffer, said data generator generating said attribute information of said data for transmission, packet by packet, in a manner such that said attribute information corresponds to said each of said packets, and delivering said attribute information to said first network circuit, said first network circuit comparing said attribute information corresponding to a present one of said packets and said attribute information corresponding to an immediately preceding one of said packets, and changing said identification information when said attribute information corresponding to said present one of said packets is different from said attribute information corresponding to said immediately preceding one of said packets.

2. A communication system comprising:

a data-transmitting unit;

at least one data-receiving unit; and a network connecting said data-transmitting unit and said at least one data-receiving unit with each other, wherein said data-transmitting unit comprises a first network circuit that adds identification information for identifying attributes of data for transmission to said data for transmission and changes said identification information when there is a change in said attributes of said data for transmission;

said at least one data-receiving unit each comprises a second network circuit that delivers a signal demanding attribute information indicative of said attributes of said data when there is a change in said identification information added to said data received from said data-transmitting unit, wherein said first network circuit is responsive to said signal demanding said attribute information from said second network circuit of any one of said at least one data-receiving unit, for delivering said attribute information demanded by said signal to said any one of said at least one data-receiving unit.

3. A communication system comprising:

a data-transmitting unit;

at least one data-receiving unit; and a network connecting said data-transmitting unit and said at least one data-receiving unit with each other, wherein said data-transmitting unit comprises a first network circuit that adds identification information for identifying attributes of data for transmission to said data for transmission and changes said identification information when there is a change in said attributes of said data for transmission;

said at least one data-receiving unit each comprises a second network circuit that delivers a signal demanding attribute information indicative of said attributes of said data when there is a change in said identification information added to said data received from said data-transmitting unit, wherein said at least one data-receiving unit comprises a plurality of data-receiving units, said first network circuit being responsive to said signal demanding said attribute information from said second network circuit of any one of said plurality of data-receiving units, for delivering said attribute information demanded by said signal to all of said plurality of data-receiving units.

4. A communication system according to claim 1, wherein said attribute information is transmitted in a packet, said packet containing said identification information.

5. A communication system comprising:

a data-transmitting unit;

at least one data-receiving unit; and a network connecting said data-transmitting unit and said at least one data-receiving unit with each other, wherein said data-transmitting unit comprises a first network circuit that adds identification information for identifying attributes of data for transmission to said data for transmission and changes said identification information when there is a change in said attributes of said data for transmission;

said at least one data-receiving unit each comprises a second network circuit that delivers a signal demanding attribute information indicative of said attributes of said data when there is a change in said identification information added to said data received from said data-transmitting unit;

said data-transmitting unit includes a transmit data buffer that forms said data for transmission into packets and delivers each of said packets to said first network circuit, said first network circuit adding said identification information to said each of said packets, wherein said data-transmitting unit includes a timer circuit that generates a time stamp for determining timing of regeneration of samples contained in said each of said packets and delivers said time stamp to said first network circuit, said first network circuit adding said time stamp to said each of said packets of said data for transmission.

6. A communication system according to claim 5, wherein said first network circuit of said data-transmitting unit adds information indicative of a number of said samples contained in said each of said packets to said each of said packets.

7. A communication system according to claim 6, wherein said at least one data-receiving unit each include a timing generator that determines timing of regeneration of each of said samples based on said time stamp and said information indicative of said number of said samples both received from said second network circuit.

8. A communication system according to claim 7, wherein said at least one data-receiving unit each include a received data buffer that stores said data, said attribute information, and said identification information, all received from said second network circuit.

9. A communication system according to claim 8, wherein said at least one data-receiving unit each include a data-utilizing circuit that takes out each of said samples from said received data buffer based on said timing of said regeneration to utilize said data.

10. A method of transmitting data from a data-transmitting unit to at least one data-receiving unit via a network, comprising the steps of:

adding identification information for identifying attributes of said data for transmission to said data for transmission at said data-transmitting unit;

changing said identification information when there is a change in said attributes of said data for transmission, at said data-transmitting unit; and demanding attribute information indicative of said attributes of said data from said at least one data-receiving unit when there is a change in said identification information added to said data received from said data-transmitting unit.

11. A method according to claim 10, including a step of transmitting said attribute information from said data-transmitting unit to any one of said at least one data-receiving unit when said any one of said at least one data receiving unit has demanded said attribute information.

12. A method according to claim 10, wherein said at least one data-receiving unit comprises a plurality of data-receiving units, the method including a step of transmitting said attribute information from said data-transmitting unit to all of said plurality of data-receiving units when any one of said plurality of data-receiving units has demanded said attribute information.

13. A communication system according to claim 2, wherein said data-transmitting unit includes a transmit data buffer that forms said data for transmission into packets and delivers each of said packets to said first network circuit, said first network circuit adding said identification information to said each of said packets.

14. A communication system according to claim 13, wherein said data-transmitting unit includes a data generator that generates said data for transmission and delivers said data for transmission to said transmit data buffer, said data generator generating said attribute information of said data for transmission, packet by packet in a manner such that said attribute information corresponds to said each of said packets, and delivering said attribute information to said first network circuit, said first network circuit comparing said attribute information corresponding to a present one of said packets and said attribute information corresponding to an immediately preceding one of said packets, and changing said identification information when said attribute information corresponding to said present one of said packets is different from said attribute information corresponding to said immediately preceding one of said packets.

15. A communication system according to claim 3, wherein said data-transmitting unit includes a transmit data buffer that forms said data for transmission into packets and delivers each of said packets to said first network circuit, said first network circuit adding said identification information to said each of said packets.

16. A communication system according to claim 15, wherein said data-transmitting unit includes a data generator that generates said data for transmission and delivers said data for transmission to said transmit data buffer, said data generator generating said attribute information of said data for transmission, packet by packet in a manner such that said attribute information corresponds to said each of said packets, and delivering said attribute information to said first network circuit, said first network circuit comparing said attribute information corresponding to a present one of said packets and said attribute information corresponding to an immediately preceding one of said packets, and changing said identification information when said attribute information corresponding to said present one of said packets is different from said attribute information corresponding to said immediately preceding one of said packets.

17. A method of transmitting data from a data-transmitting unit to at least one data-receiving unit via a network, comprising the steps of:

adding identification information for identifying attributes of data for transmission to said data for transmission at said data-transmitting unit;

changing said identification information when there is a change in said attributes of said data for transmission, at said data-transmitting unit;

demanding attribute information indicative of said attributes of said data from said at least one data-receiving unit when there is a change in said identification information added to said data received from said data-transmitting unit; and delivering said attribute information from said data-transmitting unit to said at least one data-receiving unit when said at least one data receiving unit has demanded said attribute information.

18. A method of transmitting data from a data-transmitting unit to at least one data-receiving unit via a network, comprising the steps of:

adding identification information for identifying attributes of said data for transmission to said data for transmission at said data-transmitting unit;

changing said identification information when there is a change in said attributes of said data for transmission, at said data-transmitting unit; and delivering said data for transmission and said identification information added thereto to any one of said at least one data-receiving unit from said data-transmitting unit.

19. A method according to claim 18, including a step of transmitting said attribute information from said data-transmitting unit to said any one of said at least one data-receiving unit when said any one of said at least one data receiving unit has demanded said attribute information.

20. A method of receiving data transmitted from a data-transmitting unit to at least one data-receiving unit via a network, comprising the steps of:

receiving said data for transmission and identification information for identifying attributes of said data for transmission added thereto, delivered from said data-transmitting unit at any one of said at least one data-receiving unit, said identification information being changed when there is a change in said attributes of said data for transmission; and demanding attribute information indicative of said attributes of said data from said any one of said at last one data-receiving unit when there is a change in said identification information added to said data for transmission received from said data-transmitting unit.

21. A method according to claim 20, including a step of receiving said attribute information transmitted from said data-transmitting unit when said any one of said at least one data receiving unit has demanded said attribute information, at any one of said at least one data-receiving unit.

* * * * *